United States Patent
Bates et al.

(10) Patent No.: US 7,485,810 B2
(45) Date of Patent: *Feb. 3, 2009

(54) NON-LEAD JACKET FOR NON-METALLIC SHEATHED ELECTRICAL CABLE

(75) Inventors: Eric W. Bates, Lafayette, IN (US); Thomas R. Jurczak, Fort Wayne, IN (US)

(73) Assignee: Southwire Company, Carrollton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/553,134

(22) Filed: Oct. 26, 2006

(65) Prior Publication Data

US 2007/0084622 A1     Apr. 19, 2007

Related U.S. Application Data

(62) Division of application No. 11/247,682, filed on Oct. 11, 2005, now Pat. No. 7,129,415.

(51) Int. Cl.
*H01B 7/00* (2006.01)

(52) U.S. Cl. ............... 174/110 R; 174/120 R; 174/120 C

(58) Field of Classification Search ............ 174/36, 174/110 R, 120 R
See application file for complete search history.

(56) References Cited

U.S. PATENT DOCUMENTS

| | | | |
|---|---|---|---|
| 3,064,073 A | 11/1962 | Downing et al. | |
| 3,108,981 A | 10/1963 | Clark et al. | |
| 4,522,733 A | 6/1985 | Jonnes | |
| 5,036,121 A | 7/1991 | Coaker et al. | |
| 5,216,204 A * | 6/1993 | Dudek et al. | 174/102 SC |
| 5,256,489 A * | 10/1993 | Maringer et al. | 428/450 |
| 5,326,638 A | 7/1994 | Mottine et al. | |
| 5,656,371 A | 8/1997 | Kawahigashi et al. | |
| 5,912,436 A | 6/1999 | Sanchez et al. | |
| 6,159,617 A | 12/2000 | Foster et al. | |
| 6,531,533 B1 * | 3/2003 | Kuhn et al. | 524/450 |
| 6,534,717 B2 | 3/2003 | Suzuki et al. | |

(Continued)

FOREIGN PATENT DOCUMENTS

GB     915589     1/1963

(Continued)

OTHER PUBLICATIONS

Witco Corp., Brochure titled "Fatty Acids, Glycerine, Triglycerides," (1997) (22 pp).

(Continued)

*Primary Examiner*—William H Mayo, III
(74) *Attorney, Agent, or Firm*—Kenneth R. Glaser; Gardere Wynne Sewell, LLP

(57) ABSTRACT

A jacket for an electrical conductor, which jacket includes from about 40% to about 50% by weight of a polyvinyl chloride resin and from about 0.1% to about 0.5% by weight of an unsaturated primary amide derived from erucic acid. The jacket may also include from about 20% to about 35% by weight of a filler; from about 20% to about 30% by weight of a phthalate-based plasticizer; and from about 0.5% to about 5% by weight of a lead-free heat-stabilizing system. Methods for manufacturing a lead-free NM jacket are also provided.

6 Claims, 1 Drawing Sheet

U.S. PATENT DOCUMENTS

| | | |
|---|---|---|
| 2002/0043391 A1 | 4/2002 | Suzuki et al. |
| 2003/0047712 A1 | 3/2003 | Maeda et al. |
| 2003/0096904 A1* | 5/2003 | Hakuta et al. ............... 524/588 |
| 2003/0098904 A1 | 5/2003 | Hakuta et al. |
| 2005/0139378 A1 | 6/2005 | Carlson et al. |
| 2005/0180726 A1 | 8/2005 | Carlson et al. |
| 2006/0065427 A1 | 3/2006 | Kummer et al. |

FOREIGN PATENT DOCUMENTS

| | | | |
|---|---|---|---|
| WO | WO 2006/016895 A1 | 2/2006 | |

OTHER PUBLICATIONS

Crompton Corp., Brochure titled "Vinyl Additives Product Guide," (2002) (16 pp).

Crompton Corp., Brochure on Amides (Approx. 2003) (26 pp).

Axel Plastics Research Laboratories, Inc., Product Data Sheet re "Mold Wiz, INT-33PA" (Approx. 2000) (1p).

Axel Plastics Research Laboratories, Inc., Product Data Sheet re "Mold Wiz, INT-40DHT" (Approx. 2001) (1p).

Axel Plastics Research Laboratories, Inc., Product Data Sheet re "Mold Wiz, INT-40GHT" (Approx. 2001) (1p).

* cited by examiner

NON-LEAD JACKET FOR NON-METALLIC SHEATHED ELECTRICAL CABLE

REFERENCE TO RELATED APPLICATION

This is a divisional of U.S. patent application Ser. No. 11/247,682, filed Oct. 11, 2005, now U.S. Pat. No. 7,129,415, which is relied on and incorporated herein by reference.

BACKGROUND OF THE INVENTION

The invention relates to electrical cable comprising two or more insulated conductors, preferably copper, and a bare ground conductor, preferably copper, surrounded by a non-metallic sheath ("NM jacket"). Such electrical cable is widely used in the United States building and construction industry, pursuant to Underwriter's Laboratories Standard 719. FIGS. 1 and 2 show exemplary constructions of such cable. Underwriters Laboratories uses an "NM-B" designation for building wire, where "NM" indicates a non-metallic sheath.

Non-metallic sheathed cable is preferred for residential applications such as single-family homes and apartments. It is used both in new construction and remodeling applications. The cable is often pulled through orifices that have been drilled into studs. In many instances, the orifices are not aligned with one another. In remodeling applications where drywall is already in place, the cable may also be pulled around or under studs. The cable has an NM jacket that protects the insulated current-carrying conductors. The NM jacket must remain intact during the pulling process and also strip off easily during installation. Non-metallic sheathed cable is installed by professional electricians as well as do-it-yourself people who are making changes or additions to their home.

A need exists for an NM jacket that is easy to work with. In particular, it has been recognized that an NM jacket with improved slip characteristics is needed that allows one or more electrical conductors enveloped by an NM jacket to be pulled through unaligned orifices or around studs with less pull force than was required by prior art NM jackets. A need also exists for an NM jacket that is easy to strip. In round NM jacket constructions like the one illustrated in FIG. 2, certain prior art NM jackets are difficult to strip, resulting in damage and lost productivity at the worksite.

A need also exists for a reduced toxicity and environmentally-friendly NM jacket. NM jackets are handled directly by consumers. The use of materials like lead (Pb) can cause health and environmental concerns. Thus, such materials should be avoided in a chemical formulation for an NM jacket. An NM jacket should be lead-free and should minimize or eliminate the incorporation of known and suspected carcinogens and known and suspected environmental hazards. Additionally, it was recognized that a chemical formulation for a lead-free NM jacket should be easy to process during extrusion.

SUMMARY OF THE INVENTION

The present invention addresses the shortcomings of the prior art. The claimed NM jacket comprises from about 40% to about 50% by weight of a polyvinyl chloride resin; from about 20% to about 35% by weight of a filler; from about 0.1% to about 0.5% by weight of an unsaturated primary amide derived from erucic acid; from about 20% to about 30% by weight of a phthalate-based plasticizer; and from about 0.5% to about 5% by weight of a lead-free heat-stabilizing system; wherein 100% is the weight of the NM jacket. Methods for improving slip characteristics of a lead-free NM jacket for an electrical conductor are also provided.

The claimed lead-free NM jacket is easier to pull through unaligned orifices and easier to pull around studs. Without being bound by theory, it is believed that a particular amide wax, an unsaturated primary amide derived from erucic acid, migrates to an outer surface of an NM jacket to reduce friction, improve the ease of pulling, and reduce incidence of wrinkling of the NM jacket as cable is pulled. Also, it is believed that the unsaturated primary amide derived from erucic acid may migrate to an inner surface of an NM jacket to allow conductors enveloped by the NM jacket to more readily slide inside the NM jacket. This reduces the time needed for stripping and connecting the wires.

Also, the claimed lead-free NM jacket is formulated using ingredients that improve the processability of the NM jacket chemical formulation, particularly during extrusion. In past operations using lead-free stabilizers, extrusion screen pack changes were required frequently (about every 24 hours to 72 hours). Surprisingly, using the claimed formulation, screen package changes are required during extrusion less frequently (changes are required from 96 hours to 144 hours). Improved processability also led to faster and easier cleaning of equipment during tooling changes. Improved degradation resistance was also observed. Without being bound by theory, it is believed that the improved processability results from using a lead-free stabilizer in combination with (1) a polyvinyl chloride resin having a calcium stearate additive (antistatic) having an inherent viscosity of less than 1.0, and (2) an unsaturated primary amide derived from erucic acid.

Additionally, the claimed NM jacket is lead-free and contains a unsaturated primary amide derived from erucic acid, which unlike certain other amide waxes, is not a suspected carcinogen.

DETAILED DESCRIPTION OF THE DRAWINGS

Figure 1:
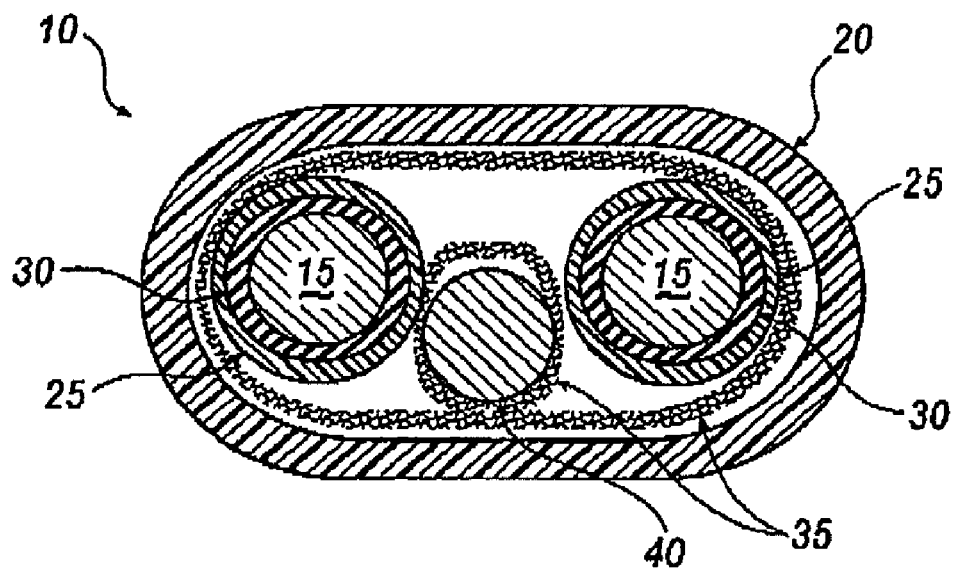
FIG. 1 is a cross-sectional view of a length of two-conductor NM-B building wire.

FIG. 1 describes an oval, two-conductor construction of NM-B sheathed wire 10 used in building and construction applications. Conductors 15, preferably formulated from copper, are enveloped in a primary insulation layer, preferably formulated from polyvinyl chloride. Enveloping the primary insulation layer 30 is a conductor jacket 25, preferably formulated from nylon. Ground conductor 40, preferably formulated from copper, is enveloped by a filler 35 such as paper. Surrounding the conductors 15, the ground conductor 40, and the filler 35 is the NM-B jacket 20. The present invention is directed to a formulation comprising the NM-B jacket 20.

Figure 2:
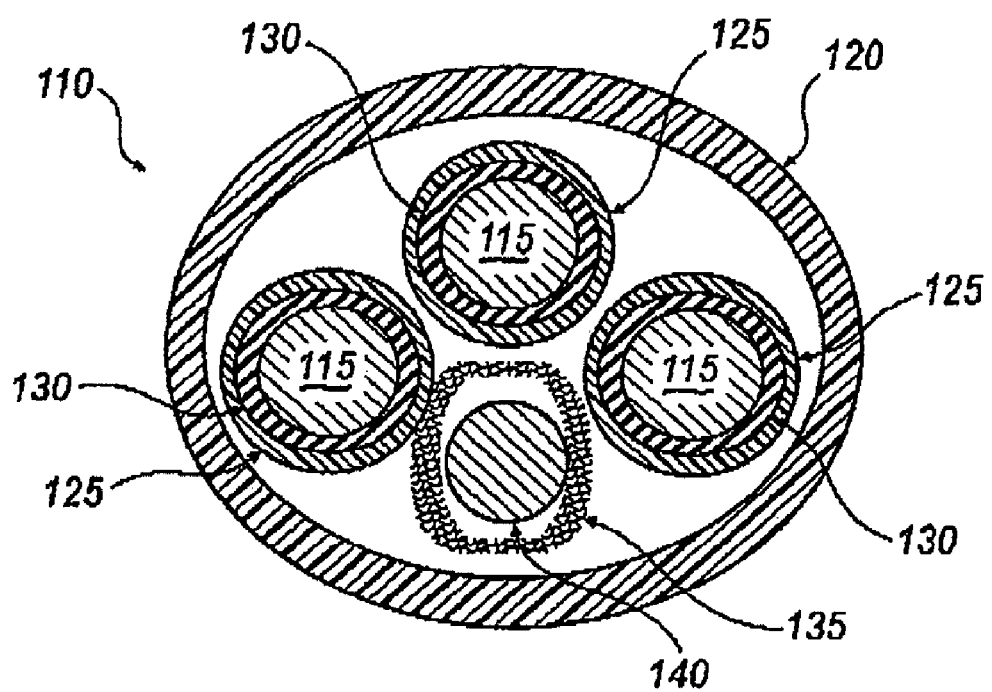
FIG. 2 is a cross-sectional view of a length of three-conductor NM-B building wire.

FIG. 2 describes a round, three-conductor construction of NM-B sheathed wire 110 used in building and construction applications. Conductors 115, preferably formulated from copper, are enveloped in a primary insulation layer 130, preferably formulated from polyvinyl chloride. Enveloping the primary insulation layer 130 is a conductor jacket 125, preferably formulated from nylon. Ground conductor 140, preferably formulated from copper, is enveloped by a filler 135 such as paper. Surrounding the conductors 115, the ground conductor 140, and the filler 135 is the NM-B jacket 120. The present invention is directed to a formulation comprising the NM-B jacket 120.

The claimed NM jacket comprises a polyvinyl chloride resin; a filler; an unsaturated primary amide derived from erucic acid; a phthalate-based plasticizer; and a lead-free heat stabilizing system.

Polyvinyl chloride (PVC) resins that may be used with the present invention are medium molecular weight, general purpose vinyl suspension resins. Such PVC resins are well known in the art and are commercially available from numerous sources. PVC resins used with the present invention should have an inherent viscosity of from about 0.93 to about 0.97, preferably about 0.95. In particular, the inherent viscosity of PVC resin of the present invention should be less than 1.0 to achieve the desired processability improvements, without sacrificing the physical properties. Preferred PVC resins include an anti-static additive such as calcium stearate or the like. A particularly preferred PVC resin is PVC-5395, which is commercially available from Georgia Gulf Corporation. PVC resins (including additives such as Calcium Stearate anti-static agent), are present in the NM jacket of the present invention, by weight percent, from about 40% to about 50%, preferably from about 43% to about 47%, where 100% is the weight of the NM jacket.

Fillers, sometimes referred to as extenders, that may be used with the present invention include metal carbonates such as calcium carbonate. Other fillers such as clay or talc may also be used. Fillers are commercially available from numerous sources. Preferably, a calcium carbonate particulate is used that has an average particle size of about 3 microns. Fillers are present in the NM jacket of the present invention, by weight percent, from about 20% to about 35%, preferably from about 25% to 30%, where 100% is the weight of the NM jacket.

An unsaturated primary amide derived from erucic acid is used with the present invention. This amide is a specific type of amide wax that is believed to have brought about a surprising level of improvement in slip resistance. Using this amide wax, the pull force was reduced by about 50% in some instances, as set forth supra in the Examples.

The amide wax used with the present invention is commercially available from the Struktol Company of American under the tradename STRUKTOL TR 131. The preferred properties of the amide wax are that it has a specific gravity of 0.93, an acid value of 3, an amide content of 99%, a melting point from about 79° C. to about 85° C. The amide wax is present in the NM jacket of the present invention, by weight percent, from about 0.1% to 0.5%, preferably from about 0.1% to about 0.3%, where 100% is the weight of the NM jacket.

A phthalate-based plasticizer is used in the NM jacket of the present invention. Such plasticizers are commercially available from ExxonMobil Chemical under the tradename JAYFLEX. Preferably, the plasticizer is diisodecylphthalate (DIDP), with an oxidation inhibitor such as Bisphenol A or Topanol CA added at less than 0.5%. Such inhibited grades are typically marked as "-e" for electrical grade (e.g. DIDP-e). Lower molecular weight phthaltes, such as diisononyl phthalate or dioctyl terephthalate may also be used with some sacrifice in heat aging performance. Higher molecular weight phthalates, such as ditridecyl phthalate or diundecyl phthalate could be used in this application, however, these materials are expensive. Secondary extending oils, such as paraffinic oils, naphthenic oils, and mineral oil may also be used. Such secondary oils can be either incorporated into the primary phthalate plasticizer or added separately to the formulation. A secondary extender oil should be used at a level low enough to avoid migration or exudation. The phthalate plasticizer is present in the NM jacket of the present invention, by weight percent, from about 20% to about 30%, preferably from about 21% to about 27%, where 100% is the weight of the NM jacket.

A lead-free heat stabilizing system is used in the NM jacket of the present invention. Although lead-free stabilizing systems can make processing a formulation for an NM jacket more difficult, it was unexpectedly discovered that in combination with certain other ingredients, the processing challenge could be resolved. In particular, this combination includes (1) a polyvinyl chloride resin having an anti-static additive such as calcium stearate additive and an inherent viscosity of less than 1.0 and (2) an unsaturated primary amide derived from erucic acid.

The heat stabilizing system can include tin-based stabilizers, mixed metal packages, metal-free stabilizers and mixtures thereof. Tin-based stabilizers include thiotin compounds, tin carboxylates, and tin mercaptides. Mixed metal stabilization packages include barium-zinc mixtures and calcium-zinc mixtures. Of these, calcium-zinc mixtures are preferred. Such stabilizers are commercially available from numerous sources, including Chemson Group and Chemtura Corporation. Metal-free stabilizers include primary organic stabilizers and organic costabilizers. These stabilizers are well known in the art, and are commercially available from numerous sources. The lead-free heat stabilizing system is present in the NM jacket of the present invention from about 0.5% to about 5%, preferably from about 1% to about 2%, where 100% is the weight of the NM jacket.

Certain optional ingredients may be added to the formulation for the NM jacket, so long as the optional ingredients do not substantially interfere with the advantages of the claimed composition. Among those optional ingredients are chemical blowing agents, especially low molecular weight organic compounds that decompose at a critical temperature or another condition achievable in extrusion and release a gas or gases such as nitrogen or carbon dioxide to fill and expand a polymeric matrix. Examples include azo compounds such as azodicarbonamide, but other chemical blowing agents may be used.

EXAMPLES

The following example was formulated in accordance with the present invention.

TABLE 1

Example Formulation

| Ingredient | Weight Percent |
|---|---|
| Polyvinyl chloride resin | 44.9% |
| Calcium carbonate | 27.2% |
| Unsaturated primary amide derived from erucic acid | 0.25% |
| Diisodecyl phthalate (DIDP-e) | 23.5% |
| Mineral oil | 2.6% |
| Calcium-zinc heat stabilizer | 1.6% |

The compound had the following nominal characteristics: specific gravity, 1.417; tensile strength, 2000 psi; elongation % of at least 200%; hardness Shore A 90/85.

The unaligned-orifice pull force and jacket strip force of the example were tested against one non-amide wax-containing NM jacket having known ingredients, including polyvinyl chloride resin (about 44.6% by weight), calcium carbonate (about 27.0% by weight), a commercially available heat stabilizing package (about 1.6% by weight), and a commercially available phthalate-based plasticizer (about 25.4% by weight), and an extender oil (about 1.3% by weight) where 100% is the weight of the non-amide wax-containing NM jacket.

TABLE 2

Pull Force Test

| Gauge size/No. Conductors | Example Pull Force (lbs) | Non-amide Wax-Containing Jacket Pull Force (lbs) |
|---|---|---|
| 14/2 | 15 | 35 |
| 12/2 | 36 | 84 |
| 10/2 | 81 | 190+ |
| 14/3 | 19 | 41 |
| 10/3 | 84 | 175+ |

TABLE 3

Strip Force Test

| Gauge size/No. Conductors | Example Pull Force (lbs) | Non-amide Wax-Containing Jacket Pull Force (lbs) |
|---|---|---|
| 14/3 | 9 | 37 |
| 12/3 | 6 | 22 |
| 10/3 | 7 | 19 |

The pull force of the example was tested against competitor NM jackets, A, B, C and D. The chemical formulation of the competitors' NM jackets is unknown.

| Gauge size/No. Conductors | Example Pull Force (lbs) | A Pull Force (lbs) | B Pull Force (lbs) | C Pull Force (lbs) | D Pull Force (lbs) |
|---|---|---|---|---|---|
| 14/2 | 15 | 22 | 15 | 42 | 52 |
| 12/2 | 36 | 45 | 33 | 77 | Not tested |
| 10/2 | 81 | 84 | 190+ | 157+ | Not tested |
| 14/3 | 19 | 27 | 26 | 51 | Not tested |
| 10/3 | 84 | 105 | 88 | 193+ | Not tested |

The preceding description and examples have been presented only to illustrate and describe exemplary embodiments of the claimed NM jacket. It is not intended to be exhaustive or to limit the products and processes to any precise form disclosed. For example, a clay may substitute as a filler, even though the example formulation used a particulate calcium carbonate filler. Many modifications and variations are possible in light of the above teaching. It is intended that the scope of the products and processes be defined by the following claims.

What is claimed is:

1. A jacket for electrical cable comprising:
   polyvinyl chloride resin; and
   from about 0.1% to about 0.5% by weight of an amide derived from erucic acid, wherein 100% is the weight of the jacket.

2. The jacket of claim 1 wherein the polyvinyl chloride resin is from about 40% to about 50% by weight.

3. The jacket of claim 2 further comprising:
   from about 20% to about 30% by weight of a phthalate-based plasticizer;
   from about 0.5% to about 50% by weight of a lead-free heat-stabilizing system; and
   from about 20% to about 35% by weight of a filler.

4. A jacket for non-metallic (NM) sheathed electrical cable comprising:
   from about 40% to about 50% by weight of a polyvinyl chloride resin, wherein 100% is the weight of the jacket; and
   from about 0.1% to about 0.5% by weight of an unsaturated primary amide derived from erucic acid.

5. An extrudable chemical formulation for a jacket for electrical cable comprising:
   from about 0.1% to about 0.5% by weight of an amide wax, wherein 100% is the weight of the jacket; and
   from about 40% to about 50% by weight of a polyvinyl chloride resin.

6. A method of improving the slip characteristics of a jacket for non-metallic (NM) sheathed electrical cable, the method comprising; providing an easy-to-process chemical formulation comprising from about 40% to about 50% by weight of a polyvinyl chloride resin; and adding a wax to the formulation, the wax comprising from about 0.1% to 0.5% by weight of an unsaturated primary amide derived from erucic acid, wherein 100% is the weight of the jacket layer composition with the wax added.

* * * * *